Feb. 10, 1925.

J. T. TRUMBLE 1,525,704

CLUTCH

Filed May 13, 1921     2 Sheets-Sheet 1

Inventor
John T. Trumble,
By
Attorneys

Feb. 10, 1925.
J. T. TRUMBLE
CLUTCH
Filed May 13, 1921
1,525,704
2 Sheets-Sheet 2
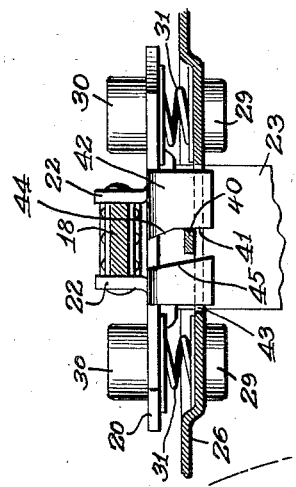
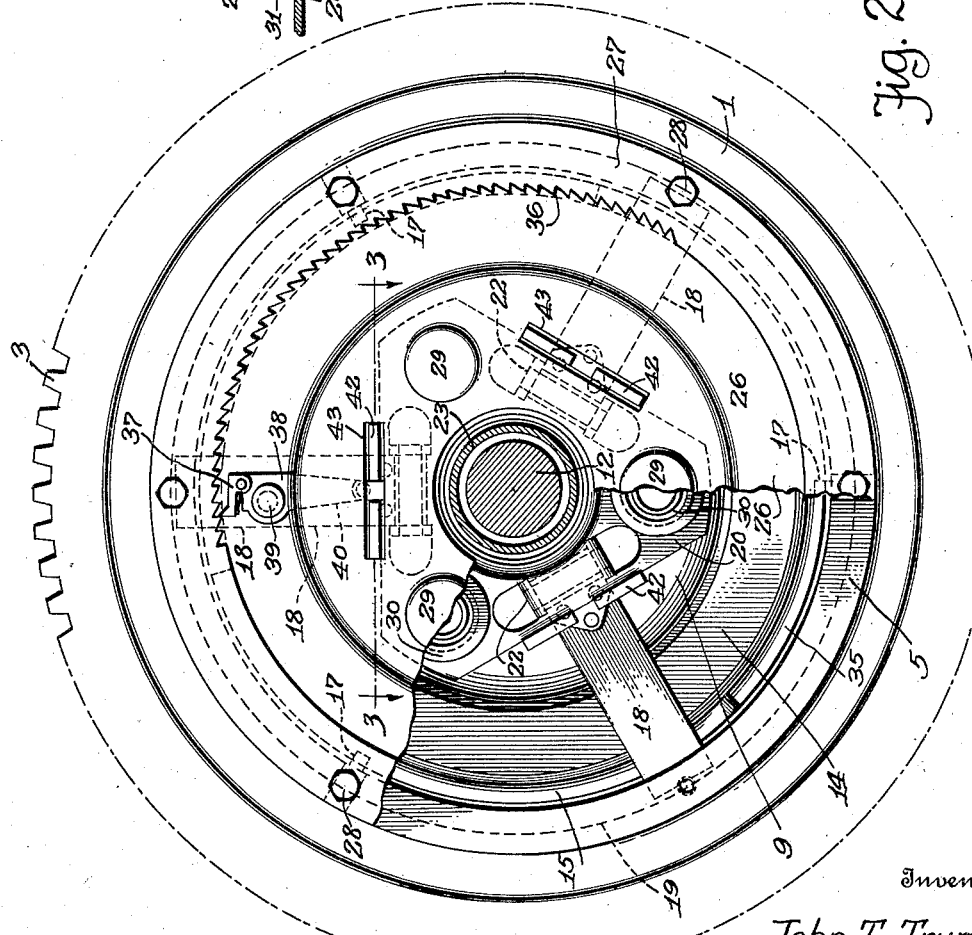
Inventor
John T. Trumble,
By
Attorneys Patented Feb. 10, 1925.

1,525,704

UNITED STATES PATENT OFFICE.

JOHN T. TRUMBLE, OF LANSING, MICHIGAN.

CLUTCH.

Application filed May 13, 1921. Serial No. 469,107.

*To all whom it may concern:*

Be it known that I, JOHN T. TRUMBLE, a citizen of the United States of America, residing at 321 S. Walnut Street, Lansing, Michigan, have invented certain new and useful Improvements in Clutches, of which the following is a specification, reference being had therein to the accompanying drawings.

Friction clutches, particularly as commonly constructed for connecting the driving and driven shafts of motor vehicles, are provided with friction surfaces which are forced into frictional contact by suitable lever mechanism to cause the transmission of motion from the driving to the driven member, but under constant use these surfaces wear away and the lever devices become less effective, causing slippage between the surfaces. Such clutches have been constructed with various adjusting means, but such means usually requires the services of an expert and considerable time to make the adjustment, particularly when the clutch is inclosed within a casing and the parts are not readily accessible. The result is that drivers often neglect to make such adjustments when required and trouble ensues, and it is an object of this invention to provide means whereby the proper adjustment will be automatically maintained.

It is also an object of the invention to simplify and cheapen the clutch construction and to so arrange its lever mechanism as to secure a maximum of leverage, thereby avoiding the necessity for heavy operating springs and securing maximum ease of manual operation.

A further object is to provide an arrangement of parts whereby a series of comparatively short operating springs may be used and a very compact device of minimum overall length secured.

With the above and other ends in view, the invention consists in the matters hereinafter set forth and more particularly pointed out in the appended claims, reference being had to the accompanying drawings in which—

Fig. 2 is an end elevation of the fly wheel and friction clutch mechanism, showing parts broken away and in section to more clearly disclose the construction; and Fig. 3 is a sectional detail substantially upon the line 3—3 of Fig. 2.

Figure 1:
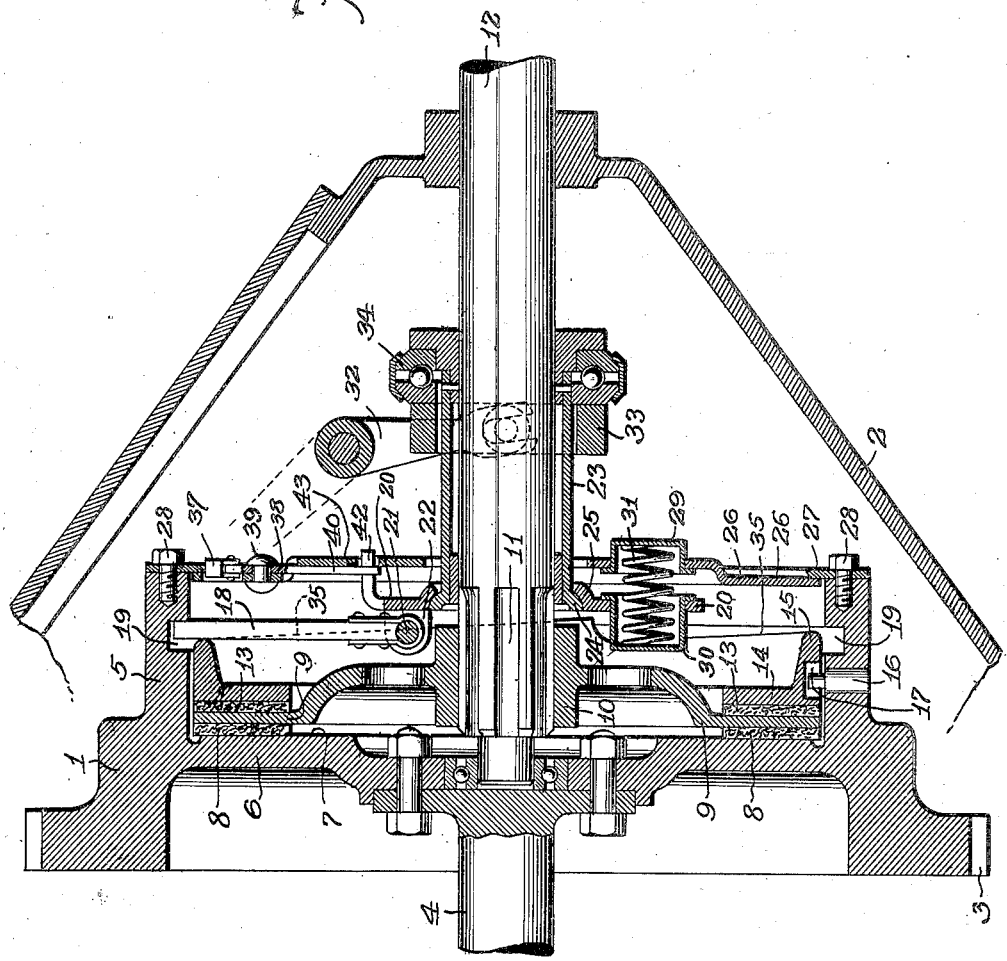
Figure 1 is a longitudinal vertical section through an engine fly-wheel showing the same as commonly applied to an engine crank shaft or other driving shaft and arranged with a driven shaft in axial alignment with the driving shaft, the friction mechanism illustrative of the invention is shown in section and in operative position relative to the fly wheel and shafts.

A friction clutch mechanism illustrative of the invention is shown as applied to an engine fly-wheel 1 of a particular construction which is enclosed within the usual casing 2, but it will be understood that this power transmitting friction clutch mechanism may be applied to any suitable form of driving member for transmitting motion therefrom to a driven shaft, the particular arrangement shown being merely illustrative of one form of construction.

As shown in the drawing, the fly-wheel 1 is provided with peripheral gear teeth 3, a construction which is commonly employed in motor vehicle constructions where an engine starter (not shown) is provided to start the engine through power applied by means of a gear engaging peripheral teeth on the fly-wheel. This fly-wheel is bolted or otherwise axially secured to the end of a driving shaft 4 which may be the crank shaft of the engine and projecting rearwardly from the fly-wheel is an annular flange 5 forming a chamber or recess at the rear side of the web 6 of the fly-wheel which web is faced off at its side forming the bottom of the chamber, to provide a smooth annular surface 7 adapted to be engaged by a friction surface 8 which is firmly secured to one side of a friction disk 9, said disk being formed with a hub portion 10 which is internally shaped to engage a formed end portion 11 on the forward end of a driven shaft 12 supported in longitudinal axial alignment with the driving shaft 4. Said engagement of the hub 10 with the driven shaft is such as to cause the disk 9 to rotate with the shaft and to have a longitudinal movement thereon. The rear or side of the disk 9 which is opposite that upon which the friction ring 8 is secured, is provided with a like friction ring 13 which also forms a friction surface for the disk, and opposed to this friction surface is a master ring 14 having a rearwardly or laterally extending edge flange or rib 15. This master ring is connected to the flange 5 of the fly wheel to turn therewith and to have a free movement axially or toward and from the friction disk 9, by providing pins 16 on the flange to engage slotted openings 17 in the edge of the ring, or any other suitable means which will permit the free movement of the ring toward and from the disk and at the same time cause the ring to turn with the fly-wheel.

To force the master ring toward the friction disk and thus clamp the disk frictionally between said ring and the annular surface 7 on the fly-wheel web, lever mechanism is provided consisting of a series of levers 18 which are in the form of straight flat bars with the outer ends of these bars engaged within an annular groove 19 formed in the rim 5 of the fly-wheel and extending radially inward with their forward faces engaging the rear edge of the flange or rib 15 on the master ring. These levers are pivotally attached at their inner ends to a carrying plate 20 by means of pivot pins 21 passing through eyes on the inner ends of the levers and through ears 22 struck up from the plate 20 to form bearings at each side of each lever for the pivot pins 21. This carrying disk 20 is mounted upon the forward end of an operating sleeve 23 mounted upon the driven shaft 12 and free to slide longitudinally thereon and to turn independently thereof. The forward end of the sleeve 23 extends through an axial opening in the plate 20 and is cupped slightly to form a flange 24 on said end having a smooth, rounded outer surface, and the disk 20 is correspondingly cupped slightly to form an inwardly extending flange 25 having a smooth, rounded inner surface to engage the surface of the flange 24. The plate and sleeve are thus connected so that upon longitudinal movement of the sleeve rearwardly upon the shaft, the plate will also be moved longitudinally of the shaft in the same direction, but the sleeve will be free to rotate relative to the plate and said plate, by reason of the curved outer surface of the flange 24 engaging the formed seat therefor at the axis of the plate, will be free to tilt slightly upon the end of the sleeve.

The open rear end of the chamber formed by the annular flange 5 on the fly wheel and within which chamber the friction disk 9, master ring 14, levers 18, and carrying plate 20 are housed, is closed by a plate 26 which is held in place by a ring 27 secured by a series of cap screws 28 to the outer edge of the rim 5 of the fly-wheel with the inner edge of said ring 27 overlapping the peripheral edge of the disk 26, and mounted in openings in this disk 26 and also in similar opposed openings in the carrying plate 20, are cups 29 and 30 forming seats for the ends of coiled springs 31 which springs are placed therein under compression so that they will always exert a force to separate the disk and plate or move the plate 20 with the sleeve 23 longitudinally of the shaft away from the plate 26 which is held against longitudinal movement by its engagement with the retaining ring 27 which is secured to the fly-wheel flange 5. The springs thus exert a force to move the pivoted inner ends of the levers 18 toward the friction disk 9 and as the outer ends of these levers are engaged within the groove 19 of the fly-wheel flange 5, the rear side of this groove will form a fulcrum for these levers and as the levers engage the flange 15 of the master ring at their forward sides, upon such movement of the inner ends of the levers toward the friction disk, the master ring will be forced into frictional contact with the friction disk and firmly clamp it between the ring and the surface 7 of the fly wheel.

By reason of the engagement of these levers with the master ring adjacent their fulcrum or fixed point of engagement with the fly wheel and the long leverage secured through the application of power to the opposite or inner ends of the levers at a comparatively long distance from their points of load application or engagement with the master ring, little force is required to move these levers and crowd the master ring into frictional contact with the friction disk with sufficient force to cause the transmission of motion from the driving to the driven shaft without slippage, and therefore comparatively light springs 31 may be used.

In order to release the clutch, the sleeve 23 is moved endwise upon the shaft against the action of the springs 31, by means of a lever 32 mounted in the casing 2 and having operative engagement with the collar 33 surrounding the sleeve and backed up by an anti-friction thrust bearing 34. It is therefore necessary for the operator to exert but little power in order to throw out the clutch because of the light power springs required and easy operation is secured.

In clutches or like devices where frictional contact between separate members is employed to connect these members and transmit motion one to the other, the contact surfaces will in time wear away due to frictional contact and the lever mechanism employed to bring them into frictional engagement will become less effective as these surfaces wear away. In the present construction, as the lining rings 8 and 13 on the disk 9 wear away, the master ring will have greater movement and therefore a greater throw of the levers 18 will be required. The springs 31, in throwing these levers, will be expanded to a greater extent and will have less force and it is therefore desirable to find means for adjusting the lever mechanism as the friction surfaces wear away. In the present construction provision has been made for automatically maintaining this adjustment, or, in other words, for adjusting the mechanism automatically during the operation of the device to compensate for wear and maintain the levers in more effective position relative to the master ring. This automatic adjustment is secured, as shown in the drawing, by forming the edge of the flange or rib 15 on the master ring which edge is engaged by the levers 18, with inclined portions, as indicated at 35, that is, where three levers are employed as in the construction shown, the flange will be provided with three steps or inclines, one for each lever and these inclines are formed by gradually increasing the width of the flange from the beginning of each incline, thus providing an edge surface to be engaged by each lever which is inclined to a transverse vertical plane of the ring. By adjusting or turning the ring and lever mechanism relatively upon their common axis as the friction surfaces wear away, the levers will be adjusted along the inclined engaging portions of the master ring of increasing width as the friction surfaces wear away and maintain the levers in the same normal relation to the ring so that the springs 31 will not be changed in their effectiveness and the leverage of the levers will remain constant.

In the construction illustrated, mechanism is provided for shifting the levers relative to the master ring, the carrying plate 20 being rotated together with the closure plate 26 by providing teeth 36 on the inner edge of the ring 27 to be engaged by a pawl 37 pivotally attached to the outer end of the swinging lever 38 which is pivoted at 39 to the plate 26 with its inwardly extending long arm 40 engaged within a slot 41 formed in an arm 42 which is preferably integral with the edge of the carrying plate 20 and is bent laterally to extend rearwardly through a slot 43 in the closure plate 26. There are preferably three of the arms 42 on the plate 20 extending through slots 43 in the closure plate so that the plates 20 and 26 will be connected together by these arms and caused to rotate in unison but will have a free relative movement longitudinally of the shaft, that is, the carrying plate 20 may be moved freely toward and from the plate 26 by means of manually operable lever 32 and the action of the springs 31, these arms 42 sliding freely through the slots 43 in the plate 26 whenever the clutch is thrown out by the lever 32 or thrown in by the action of the springs 31. The slot 41 in the arm 42, which slot is engaged by the long arm 40 of the swinging lever 38, is inclined throughout a portion of its length to the plane of movement of the arm as the carrying disk is moved longitudinally during the throwing in or out of the clutch and therefore the lever 38 will be forced to swing upon its pivot 39 whenever the clutch is thrown in or out. As the pawl 37 is carried by the short arm of the swinging lever 38 and is arranged to engage the teeth of the fixed ring 27 on the fly-wheel, the swinging movement of the lever will, by reason of the engagement of the pawl with said teeth, cause a clock-wise rotation of the closure plate 26 and as the carrying plate 20 is connected by the arms 42 with the plate 26 to rotate therewith, said carrying plate will also be turned and carry with it the several levers 28 which are mounted thereon. This adjustment of said levers will move them up the inclines 35 of the master ring and the wear of the friction surfaces will be compensated for.

The forward side, or the side in the direction of rotation, of the slot 41 is preferably made with a straight portion at the outer end of the arm and an inner inclined portion 44 arranged at an angle to the outer end portion, this portion 44 being inclined rearwardly in the direction of rotation of the plate 9. When the parts are in the position shown in the drawing with the clutch in and the operator throws out the clutch by means of the lever 32, the first movement of the carrying plate will have no effect in swinging the lever 38, as the long arm of this lever will be in contact with the outer straight end portion of the slot 41 but further movement will bring the arm into engagement with the inclined portion 44 of the slot and cause the lever 38 to swing and advance the pawl so that if the swinging movement be great enough this pawl will engage another tooth of the ring 27. When the operating lever 32 is released the springs will act to move the carrying plate 20 inwardly and the arm 42 will be retracted, thus bringing the rear inclined side 45 of its slot 41 into engagement with the lever 38 and swing this lever in a direction opposite to that in which it was swung when the arm 42 was projected. If the pawl 37 at this time be in engagement with one of the teeth 36, this swinging movement of the arm 38 caused by its engagement with the side 45 of the slot will impart a rotation to the closure plate 26 to which the lever 38 is pivotally attached and thereby adjust the carrying plate 20 and levers 18 carried thereby.

It will be noted that as the friction surfaces wear away, the levers 18 will have a greater throw and their carrying plate 20 will move farther and farther inward or away from the closure plate 26, thus causing a greater and greater retraction of the arm 42, and because of the inclined side of the slot 45, the greater the retraction of the arm 42, the greater distance will the pawl carrying lever 38 be swung by its engagement with this side of the slot. Therefore the throwing in and out of the clutch will simply swing the lever 38 back and forth with the pawl riding up and down the inclined side of a tooth 36 until such time as the friction surfaces wear away sufficiently to permit a retraction of the arm 42 which is great enough to swing the lever 38 a sufficient distance to carry its pawl over the point of the next tooth and then upon the next throwing out of the clutch the adjustment will take place. The adjustment is therefore controlled entirely by the wearing away of the friction surfaces and will take place only when these surfaces have been worn away sufficiently to cause a movement of the carrying plate and a retraction of the arm 42 which is sufficient to impart a swing to the pawl carrying lever long enough to carry its pawl over the point of the next tooth.

The teeth 36, length of the lever 38, arrangement of the slot 41, are proportioned in relation to the variation in throw of the levers 18 caused by the wearing away of the friction surfaces, so that a very accurate adjustment is secured and the lever mechanism will be maintained in proper adjustment to always force the friction member into firm frictional contact and prevent slippage under all conditions.

It is obvious that one or more adjusting levers 38 may be employed and that the arrangement of the mechanism and means for adjusting the levers 18 relative to the master ring may be varied or modified within the scope of the appended claims without departing from this invention. It is also obvious that adjusting mechanism falling within the scope of the appended claims may be applied to other clutch constructions and other forms and arrangements of friction members to compensate for wear thereof.

It is also obvious that the details of construction, combination and arrangement of parts of the clutch mechanism may also be widely varied within the scope of the appended claims without departing from the spirit of the invention and I do not therefore limit myself to the construction or arrangement shown.

Having thus fully described my invention, what I claim is:—

1. In a clutch, the combination with a driving member and a driven member, of friction members for transmitting motion from the driving to the driven member, lever mechanism for applying power to force said friction members into frictional contact, said mechanism including levers fulcrumed at one end and arranged to apply power directly to said friction members intermediate their ends, carrying means for said levers, power means for moving the carrying means and levers to apply power to the friction members, manually operable means for moving the carrying means against the action of said power means, and means operated by movement of the carrying means for adjusting said lever mechanism and friction members relatively, said adjusting means being controlled in its operation by the movement of said levers.

2. In a clutch, the combination with a driving member and a driven member, of friction members for transmitting motion from said driving to said driven member, of lever mechanism for moving said friction members into frictional contact, said lever mechanism including a plurality of radially extending levers fulcrumed at their outer ends and engaging one of the friction members adjacent their fulcrums, means for pivotally supporting said levers at their inner ends and swinging the same to engage and release the friction members, and means for adjusting said levers and friction members relatively, said adjusting means being operated by the swinging movement of said levers.

3. In a clutch, the combination with a driving member and a driven member, and friction members for transmitting motion from the driving to the driven member, of power means for forcing the friction members into frictional contact including a lever for engaging and moving said friction members, said lever having a swinging movement longitudinally of the driven member, and means engaged by said lever to be operated by the swinging movement thereof for adjusting said lever and friction members relatively.

4. In a clutch, the combination with a driving member and a driven member and friction members for transmitting motion from the driving to the driven member, of power means for forcing the friction members into frictional contact including levers for engaging and moving said friction members, said levers having a swinging movement longitudinally of the driven member, and means including a pawl and ratchet for adjusting said levers and friction members relatively, said pawl and ratchet being operated by the swinging movement of said levers.

5. A clutch as characterized in claim 2, and wherein said levers are carried by a carrying member movable longitudinally of the driven member, and wherein said adjusting means includes a pawl and ratchet arranged to impart rotation to the carrying member and to be operated by the longitudinal movement of said carrying member.

6. A clutch as characterized in claim 2 and wherein said levers are pivotally attached at their inner ends to a carrying member, movable longitudinally of the driven member, and wherein the adjusting means includes a pawl and ratchet, and a swinging lever for operating the pawl, said swinging lever being operated by the longitudinal movement of said carrying member.

7. In a clutch, the combination with a driving and a driven member, of friction members for transmitting motion from the driving to the driven member, said friction members including a master ring, radially extending levers fulcrumed at their outer ends and engaging the master ring adjacent said outer ends, a carrying plate for the levers to which said levers are pivotally attached at their inner ends, said plate being movable longitudinally of the driven member for swinging said levers, springs for moving the carrying plate in one direction, manually operable means for moving the plate against the action of said springs, and means for adjusting said levers and master ring relatively, said means being operated by the swinging movement of said levers.

8. In a clutch, the combination of a driving shaft, a driven shaft arranged in axial alignment with the driving shaft, a member secured to the driving shaft and formed with an end friction surface and an annular flange, friction members including a master ring for transmitting motion from the driving shaft to the driven shaft, a plurality of radially extending levers fulcrumed at their outer ends on said annular flange, said master ring being formed with surfaces inclined to the plane of the ring to engage said levers intermediate their ends, a carrying plate to which said levers are pivotally attached at their inner ends, said plate being mounted for longitudinal movement upon said driven shaft, means for moving said plate longitudinally to swing said levers, and means operated by longitudinal movement of said carrying plate for rotating said plate and adjusting said levers along the inclined surfaces of the master ring.

9. In a clutch, the combination of a driving shaft, and a driven shaft arranged in longitudinal axial alignment, a fly-wheel secured to the driving shaft and having a concentric annular flange and an end contact face within the flange, friction members to engage said face of the fly-wheel and to engage each other, said friction members forming means for transmitting motion from the driving to the driven shaft, radially extending levers fulcrumed at their outer ends upon the fly wheel flange and engaging one of the friction members intermediate their ends, a carrying plate mounted upon the driven shaft for longitudinal movement thereon and to which the inner ends of said levers are pivotally attached, a closure plate for closing the space between the driven shaft and the outer end of the fly-wheel flange, means for adjusting said levers and friction members relatively, said means including a pawl and ratchet and a swinging lever for carrying the pawl, said swinging lever being pivotally mounted upon said closure plate, arms on the carrying plate extending through openings in the closure plate, one of said arms being formed with a slot inclined to the plane of the longitudinal movement of the carrying plate and adapted to be engaged by said swinging lever to swing said lever and operate the pawl and ratchet upon longitudinal movement of the carrying plate, springs for moving the carrying plate longitudinally in one direction, and manually operable means for moving the carrying plate against the action of said springs.

In testimony whereof I affix my signature in presence of two witnesses:

JOHN T. TRUMBLE.

Witnesses:
ANNA M. DORR,
CHAS. W. STAUFFIGER.